No. 762,946. PATENTED JUNE 21, 1904.
C. W. SALISBURY.
WHEEL.
APPLICATION FILED OCT. 1, 1903.
NO MODEL.
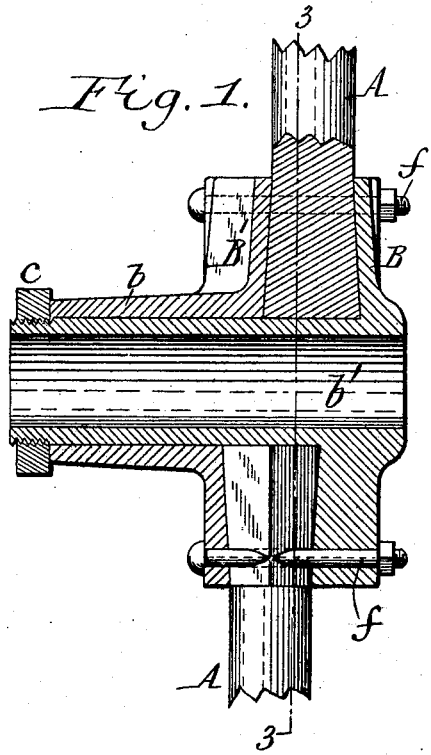
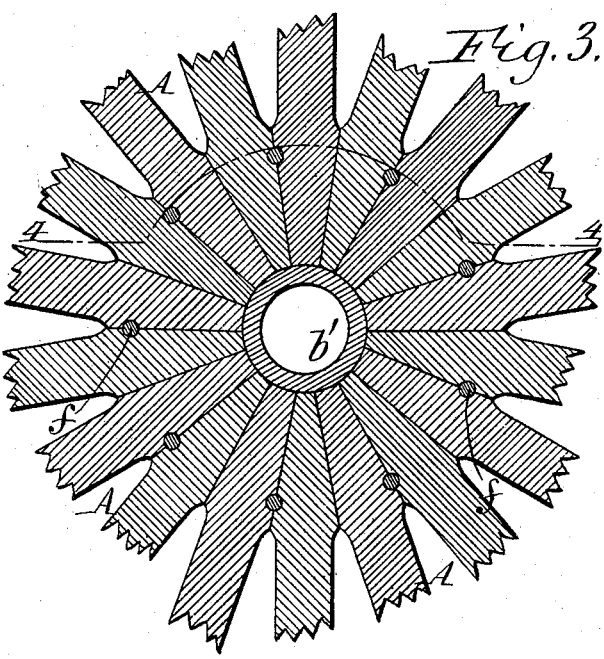
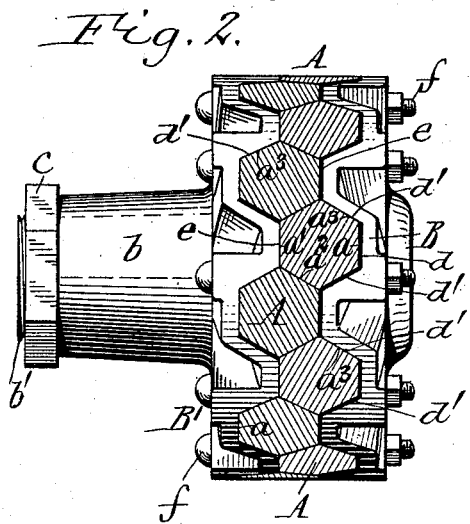
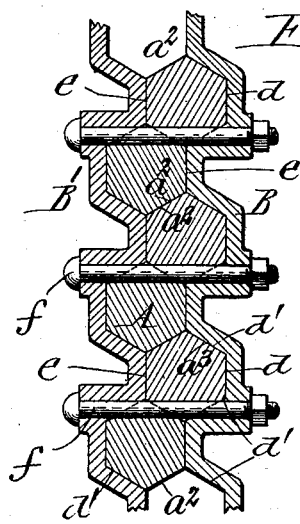
Witnesses:
Robert Weitknecht.
Louis W. Gratz.
C. W. Salisbury,
Inventor
By Geyer & Popp
Attorneys.

No. 762,946. Patented June 21, 1904.

UNITED STATES PATENT OFFICE.

CLARK W. SALISBURY, OF JAMESTOWN, NEW YORK, ASSIGNOR TO SALISBURY WHEEL & MANUFACTURING COMPANY, OF JAMESTOWN, NEW YORK.

WHEEL.

SPECIFICATION forming part of Letters Patent No. 762,946, dated June 21, 1904.

Application filed October 1, 1903. Serial No. 175,319. (No model.)

*To all whom it may concern:*

Be it known that I, CLARK W. SALISBURY, a citizen of the United States, residing at Jamestown, in the county of Chautauqua and State of New York, have invented new and useful Improvements in Wheels, of which the following is a specification.

This invention relates to that class of wheels which are more particularly designed for use in motor-operated vehicles in which the driving strain from the motor to the wheels is transmitted through the hub of the latter, and therefore necessitates a strong and durable connection between the hubs and the spokes of the wheels.

The object of this invention is to produce a wheel for this purpose which is comparatively simple in construction and in which any slack between the spokes and the hub can be readily taken up for rendering the same water and dust tight.

In the accompanying drawings, Figure 1 is a fragmentary vertical longitudinal section of my improved hub-and-spoke connection for wheels. Fig. 2 is a sectional side view of the same, showing the spokes cut off close to the hub. Fig. 3 is a vertical section in line 3 3, Fig. 1. Fig. 4 is a fragmentary cross-section in line 4 4, Fig. 3.

Similar letters of reference indicate corresponding parts throughout the several views.

A represents the radial spokes secured at their inner ends to the hub, which consists, essentially, of inner and outer circular clamping-plates B B', bearing against opposite sides of the spokes, an inner sleeve $b'$, connected at one end with the outer sleeve, an outer sleeve $b$, surrounding the opposite end of the inner sleeve and connected with the inner plate, and a screw-nut $c$, arranged on the threaded inner end of the inner sleeve and bearing against the adjacent outer end of the outer sleeve. The annular space between the two clamping-plates flares or enlarges inwardly from their periphery in a plane parallel with the axis of the wheel, and the inner ends of the spokes seated in said space have a corresponding inward enlargement forming a dovetail joint between the spokes and hub-plates, which prevents the same from being separated by a radial pull on the spokes.

Each of the spokes is preferably made hexagonal in cross-section at its inner end and is so arranged that two of its parallel sides $a\ a'$ stand transversely to the axis of the hub, while its inner and outer oblique sides $a^2\ a^3$ converge lengthwise of the axis of the hub in opposite directions from the central part of the spoke toward the inner and outer transverse sides $a\ a'$, as shown in Figs. 2 and 4.

Each of the clamping-plates is provided on its inner side with an annular row of seats, which are semihexagonal, each of which receives one-half of a hexagonal spoke and comprises a transverse bottom $d$ and two oblique faces $d'\ d'$, which diverge from the bottom of the seat to the inner side of the plate. Between its sockets each clamping-plate is provided with transverse faces $e$, each of which is constructed to engage one of the hexagonal sides of a spoke.

In assembling the parts of the hub and the spokes the plates are so arranged that the transverse faces $e$ of one plate stand opposite the seats of the other plate, the two plates being separated, so that each half-seat on one plate and the opposing transverse face $e$ of the other plate form four sides of a complete socket for engaging the corresponding number of sides of a spoke. When the plates are thus placed, the several sockets formed in the space between the plates are staggered or arranged in zigzag fashion around the hub, and each socket communicates with adjacent sockets by spaces each of which corresponds to one of the flat sides of the hexagonal surface on a spoke. By this means each of the spokes when put in its place fits with one of its transverse sides and the adjacent oblique sides against the corresponding sides of the half socket or seat on one plate. Its opposite transverse side engages the transverse face $e$ of the other plate, and the other oblique sides bear against the corresponding oblique sides of adjacent spokes on a line with the spaces which establish communication between the sockets. It will thus be seen that three sides of the hexagonal socket for each spoke are formed in one plate, two sides thereof are formed by two adjacent spokes, and one side is formed by the other plate. Upon drawing the plates together after the spokes have been inserted the coöperating oblique sides of the spokes are pressed against each other and the plates press against opposite sides of the spokes, whereby the latter are securely held in place.

Although various means may be employed for drawing the plates together in addition to the screw-nut $c$, I prefer for this purpose an annular series of bolts $f$, which connect the plates near their periphery and pass through the intervening part of the spokes. As shown in the drawings, one bolt is arranged to pass through each pair of adjacent spokes at the joint between the same, so that each bolt serves the purpose of connecting the clamping-plates and also assists in securing a pair of spokes against radial displacement in their sockets.

My improved construction of hub-and-spoke connection is not only very simple and durable, but the same also reduces the waste of stock in making spokes, as the inner ends of the spokes are nearly of the same transverse dimensions as the body of the spokes. Furthermore, if any slack or looseness occurs between the spokes and the plates, owing to drying out of the former, this can be readily taken up by tightening the screw-nuts of the clamping-bolts. When the parts are thus tightened, the wedge action of the oblique faces of each socket or seat against the corresponding faces on one side of a spoke and the opposite oblique sides of the same spoke against the coöperating oblique faces of the opposing spokes causes the spokes to be firmly engaged on all sides and form a tight joint between the spokes and the hub, thereby effectually excluding moisture, sand, and grit from this joint, whereby the spokes are prevented from rotting or grinding in the hub and soon wearing out.

I claim as my invention—

1. A wheel comprising spokes provided with sides which are oblique to the axis of the wheel, and clamping-plates arranged on opposite sides of the spokes, each spoke being seated in a socket formed partly by oblique faces on one plate engaging some of the oblique sides of the spoke and partly by the oblique sides of adjacent spokes, substantially as set forth.

2. A wheel comprising spokes provided with sides which are oblique relatively to the axis of the wheel, and clamping-plates arranged on opposite sides of the spokes, each spoke being seated in a socket formed partly on one plate, partly by oblique faces on the other plate engaging some of the oblique sides of the spoke and partly by the oblique sides of adjacent spokes, substantially as set forth.

3. A wheel comprising spokes and clamping-plates arranged on opposite sides of the spokes, said spokes having inner hexagonal ends which are staggered and engage each other on opposing oblique sides and said plates having faces which are oblique relatively to the axis of the wheel and engage oblique sides of the spokes, substantially as set forth.

4. A wheel comprising spokes and clamping-plates arranged on opposite sides of the spokes, said spokes having inner hexagonal ends which are staggered and each spoke having two of its parallel sides arranged transversely relatively to the axis of the wheel while its remaining sides are arranged obliquely thereto and said plates having their opposing sides constructed to form an annular series of staggered hexagonal sockets for receiving the correspondingly-formed ends of the spokes, each of said spokes being seated with one half of its hexagonal surface comprising a transverse side and two oblique sides in a semihexagonal socket formed in one of said plates and engaged on its opposite transverse side against a corresponding face on the other plate while its remaining oblique sides engage with the corresponding oblique sides of adjacent spokes, substantially as set forth.

Witness my hand this 28th day of September, 1903.

CLARK W. SALISBURY.

Witnesses:
J. DELEVAN CURTISS,
SCOTT H. PENFIELD.